United States Patent Office

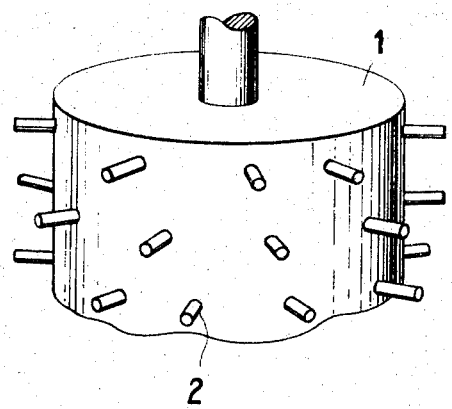
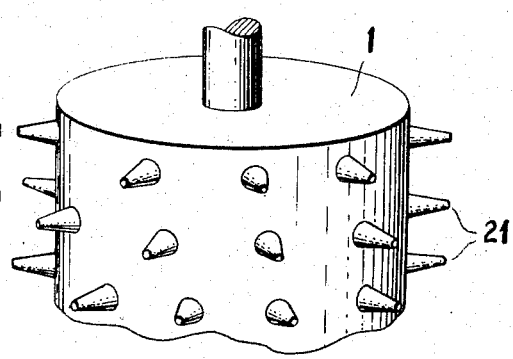
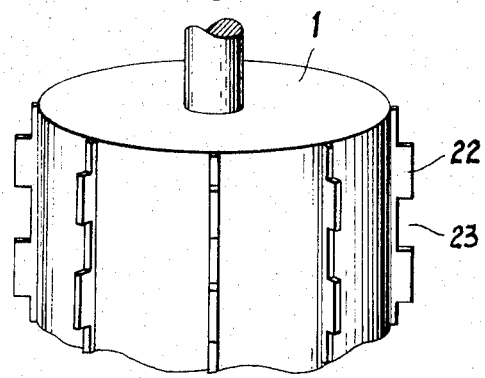

3,438,742
Patented Apr. 15, 1969

3,438,742
APPARATUS FOR CONTINUOUS SULPHONATION AND/OR SULPHATION OF ORGANIC SUBSTANCES
Helmut Grunewald, Goteborg, and Olof Steijner, Stenungsund, Sweden, assignors to Mo och Domsjo Aktiebolag, Ornskoldsvik, Sweden, a corporation of Sweden
Filed Nov. 3, 1964, Ser. No. 408,624
Claims priority, application Sweden, Nov. 4, 1963, 12,099/63
Int. Cl. B01l 11/00; F28d 7/10
U.S. Cl. 23—285    9 Claims

ABSTRACT OF THE DISCLOSURE

Apparatus is provided for carrying out exothemic reactions of organic substances, requiring cooling during the reaction to maintain reaction temperature within a desired range. The apparatus comprises two concentrically spaced cooling surface members. One of the cooling surface members is movably mounted with respect to the other and is provided with members protruding at approximately right angles to the cooling surface, and arranged to impart a rotating axial and lateral turbulent movement to fluid in the space between the cooling members. The apparatus also contains means for introducing fluid into the space, and means for carrying away fluid ejected from the space by such rotation. The apparatus of the invention is particularly useful in carrying out a process for continuous sulphonation and/or sulphation of fluid organic compounds with sulphur trioxide.

---

Figure 1:
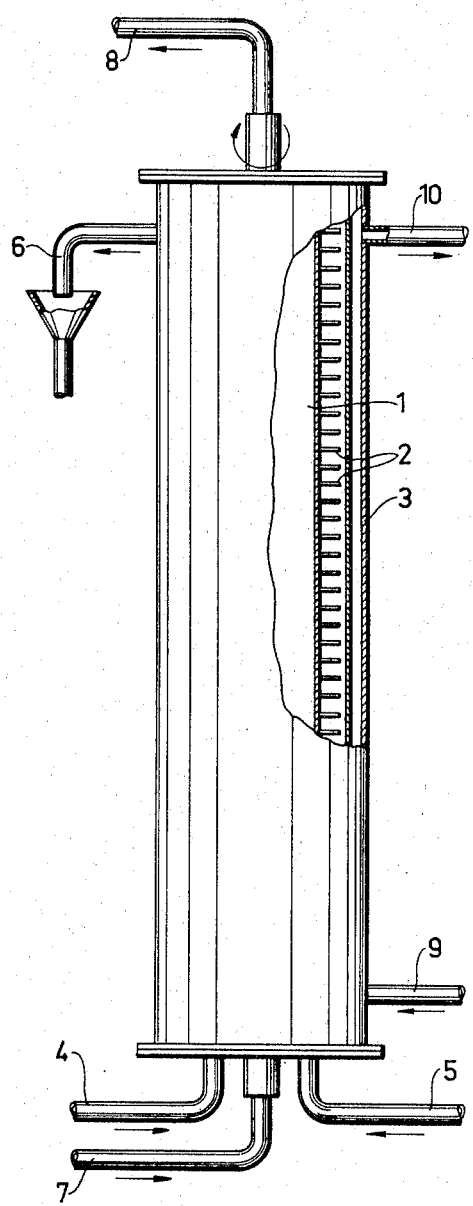

This invention relates to a process for continuous sulphonation and/or sulphation of organic substances with sulphur trioxide gas in an inert gaseous medium and to an apparatus for carrying out the process.

Sulphonation or sulphation processes involving the use of sulphur trioxide are highly exothermic and, to prevent the finished product from being coloured dark by the products of decomposition, the sulphur trioxide gas should be diluted with a large amount of inert gas, e.g., air, carbon dioxide, nitrogen, or sulphur dioxide gas, and the heat of reaction should be carried away very quickly. When carrying out the process in batches it is relatively simple to maintain these conditions of reaction, since it is then possible to work with a large volume of the organic substance in relation to the amount of sulphur trioxide supplied at any moment and the momentaneously developed heat of reaction can be distributed by rapid stirring in the reaction mixture, from which the heat is carried off via the cooled surfaces of the apparatus. In this process, however, the viscosity of the reaction mixture increases substantially with an increasing degree of sulphonation and/or sulphation, which leads to deterioration of the colour of the product on account of the resultant reduced rate of transference of heat. Further, the consumption of applied mechanical stirring energy is increased and the reaction time is prolonged. Normally, a batchwise reaction of 1000 kg. of raw material takes about 4 hours.

In order to reduce the reaction time and to attain more efficiently utilized cooling surfaces continuous methods have therefore been proposed, which, provided that suitable reaction conditions are satisfied, permit a very rapid course of reaction—shorter than one minute. In order to ensure a good result, however, it is then necessary for the sulphur trioxide gas to be mixed with an inert gas, so that the concentration of sulphur trioxide gas preferably is lower than about 7%. This means that, for example in the sulphonation of dodecyl benzene, it is necessary to react about 1000 liters of gas per liter of raw material. In such a continuous sulphonation and/or sulphation process it is extremely important for the organic substance to be mixed with the gaseous mixture containing sulphur trioxide gas with the utmost possible speed. The organic raw material should preferably be present in liquid form, and during the reaction the sulphonation and/or sulphation medium should be present in this liquid in a dispersed form. Further, the heat of reaction should be carried away with the utmost possible speed so that the reaction temperature nowhere exceeds 70° C., while it should preferably be maintained at about 20–30° C., as otherwise the products will be dark in colour. It is also extremely important to bring about the quickest possible removal of the product of reaction from the reaction zone.

Methods for continuous sulphonation and/or sulphation of organic substances with sulphur trioxide gas as the means of sulphonation and/or sulphation in an inert gaseous medium, where the reaction mixture is led between two cooled walls which are movably arranged in relation to each other, have been proposed earlier. According to one of these use was made of a reactor consisting of a fixed, cooled stator, in which is arranged concentrically an inner, revolving, cooled rotor, the shaft of which can be horizontally or vertically mounted and the speed of which is adjustable. The space formed between the rotor and the stator in the said device is utilized as a reaction zone, the volume of the space being adjustable so that the reaction product formed remains in the reactor only for a very short time, preferably less than one minute. The reactant mixture is preferably passed concurrently with the gas mixture containing sulphur trioxide. Although the method of utilizing devices of the type described above possesses considerable advantages in comparison with discontinuous methods, it has nevertheless been found that difficulties arise in maintaining constant conditions throughout the entire course of reaction. In some cases, despite the relatively good stirring, small amounts of reaction products are obtained with high viscosity. These can adhere to the walls of the stator and give rise to discolouration of the final product. Further, in some cases an uneven degree of sulphonation of the final product may be obtained. The said disadvantages can be encountered even if a relatively high gas flow rate is maintained throughout the entire process and are particularly noticeable in the case of more difficult sulphonation and/or sulphation processes, such as, for example, sulphonation and/or sulphation of fatty alcohols and certain ethylene oxide adducts thereof.

The present invention relates to a continuous process for sulphonation and/or sulphation of organic substances with sulphur trioxide gas in an inert gaseous medium, in which the reaction mixture is passed between two cooled walls, one of which is movably mounted in relation to the other, this process being unmarred by the aforesaid disadvantages.

The process according to the invention is characterized in that a rotating, axial and lateral, turbulent movement is imparted to the reaction mixture in that the movable cooling surface is given a rotating movement and is provided with members protruding in the space between the cooling surfaces so as to attain an intensified contact between the organic liquid and the sulphonation and/or sulphation medium and which increase the turbulence of the reaction mixture, thus improving the dispersion of the sulphonation and/or sulphation medium in the organic liquid. The said members, hereinafter referred to as "protruding members," are so designed that the formed reaction products are passed on towards the outlet without remaining in the vicinity of the protruding members.

Because of the rotating, axial and lateral, turbulent movement obtained according to this process, it is possible to obtain an improved dispersion of the reaction mixture in the organic substance without impeding the movement of the reaction products towards the outlet opening, whereby local oversulphonation or oversulphation accompanied by discolouration of the reaction product is entirely avoided. In the process according to the invention, a dispersion is obtained of the sulphonation or sulphation gas mixture in the organic substance, in which the average diameter of the gas bubbles does not exceed 5 mm. and is preferably less than 1 mm. The sulphonation or sulphation is carried out at a temperature from about 15 to about 70° C., preferably from 20 to 30° C., and the process can be utilized for sulphonation and/or sulphation of any sulphonatable or sulphatable organic raw materials such as aliphatic and cyclic (carbocyclic and heterocyclic) organic compounds. These are all known compounds and form no part of the invention but are merely substrates acted on therein. Examples of such compounds are fatty alcohols, preferably with a $C_8$–$C_{18}$ carbon chain, preferably but not necessarily containing one or more double bonds, benzene, toluene, nonylbenzene, xylene, dodecyl benzene and nonyl naphthalene. Naturally, the raw material may also consist of mixtures of such compounds. It is also possible to include with the organic liquid substrate additives, which themselves will not be sulphonated and/or sulphated, being instead intended to serve some other purpose, for example as viscosity reducers or solvents. As examples of such additives mention may be made of ethylene dichloride and acetic acid. These products can be added prior to, during or after the sulphonation or sulphation process, depending on the purpose which the additive is to serve.

This present invention relates further to an apparatus for carrying out the continuous sulphonation and/or sulphation process according to the invention in which like numbers are used for like parts. The apparatus is shown schematically in the accompanying drawings, of which FIG. 1 is a vertical view of an apparatus of this invention partly in section, while FIGS. 2 to 4 are perspective sketches of three suitable types of protruding members, viz. cylindrical pegs (2, FIG. 2), conical pegs (21, FIG. 3) and flat, profilated, throughgoing members (22, FIG. 4), showing their arrangement on the movable cooling surface. The arrangement as shown in FIGS. 1 and 2 is characterized by a largely cylindrical drum 1, rotatable around its axis of symmetry and cooled on the inside, which is provided on the whole or major part of its outside with a number of projecting pegs 2 to cause turbulence in the medium surrounding the members upon rotation of the drum, by a stationary, outer cooling jacket 3 which surrounds the drum concentrically, inlets 4 and 5 for the sulphur trioxide gas mixture and the organic substance 5, respectively, outlet 6 for reaction product and residual gas mixture, inlet 7 and outlet 8 for cooling of the rotating drum, and inlet 9 and outlet 10 for cooling of the cooling jacket 3 surrounding the drum.

The protruding members can be designed in many different ways, but an indispensable condition is that they are so designed and positioned on the movable cooling surface that no so-called dead zones appear in their vicinity, where reacted product can remain in the form of lumps with a higher viscosity and thereby be oversulphonated or oversulphated, resulting in discolouration of and an uneven degree of sulphonation or sulphation in the final product. This is of particular importance in the sulphonation and/or sulphation of highly viscous, organic liquids. The protruding members must thus not put up any great resistance to the flow of the reaction mixture towards the outlet. They can, for instance, be made in the form of largely cylindrical or conical pegs or pins with a largely circular cross-section, which are affixed to the movable cooling surface at an appropriate distance from one another. The height of the pegs will naturally depend on the distance between the two cooling surfaces and on the speed of the moving cooling surface in relation to the stationary cooling surface. The height should be as great as the available space between the cooling surfaces, with due regard to what is permitted by the manufacturing tolerance. In this way, the formation of poor heat-conducting layers between the stationary cooling surface and the liquid/gas dispersion is avoided and the liquid turnover is increased. A suitable dimension for the height of the said pegs has been found to be 0.5–0.9 times the distance between the two cooling surfaces at a relative speed of 5 to 15 metres per second on the part of the moving cooling surface, but in certain cases the height can be even smaller, e.g., down to 0.1 times the said distance. If the pegs are largely cylindrical in shape as shown at 2 in FIG. 2, they should have a cross-sectional dimension of 0.1 to 1 times the distance between the two cooling surfaces. If conical pegs are used as shown at 21 in FIG. 3, the base of the cone can be located on the moving cooling surface. The tip of the cone should be cut off squarely and should not display a diameter smaller than that for cylindrical pegs. It is also possible with regard to conical pegs to allow the base of the cone to be turned towards the stationary cooling surface in order to improve the retention of the organic liquid on the rotating cooling surface, although this form of design involves higher manufacturing costs in respect of the apparatus. The distance between the pegs is dependent on the relative speed of the moving cooling surface and should be chosen so that as intensive dispersion of the organic liquid as possible is obtained. The pegs, however, must not be too close to one another, as in such cases gas-filled strings may develop between the pegs, without sufficient liquid turnover in the surface layer of the strings, thereby creating a risk of over sulphonation and/or oversulphation and the resultant product will be discoloured. A suitable distance between the pegs has been found to be about 8–20 peg diameters, measured in the direction of motion of the moving cooling surface at the above-mentioned relative speed. This distance is preferably 9 to 15 peg diameters and a distance of about 10 peg diameters has proved particularly suitable. At right-angles to the directtion of motion of the moving cooling surface, the best result is obtained with a distance of about 3 peg diameters or more. Good results have been obtained with a distance in this direction of 4–15 peg diameters, a distance of about 5 peg diameters having proved particularly suitable.

The protruding members may also be in the form of baffles, i.e., largely rectangular or square, flat members, as shown at 22 in FIG. 4, applied along the whole or a part of the moving cooling surface, which may possibly be provided with drilled recesses to achieve an intensified contact. If such flat protruding members are utilized, these should preferably not be throughgoing and alike over the entire cooling surface, but in order to reduce the tendency to form gas bubbles behind the baffle should be patterned in the form of cut-off parts 23, as shown in FIG. 4. The most protruding parts of the protruding members can then be displaced in relation to one another so as to form a coil in the direction of flow. A suitable design of baffle has been found to have a largely rectangular cross-section in the direction of motion with a height of 0.2 to 0.9 times the distance between the cooling surfaces and a width of 2 to 5 times the distance between the cooling surfaces, and with rectangular recesses as shown in FIG. 4 with a height of 0.3 to 0.7 and a width of 3 to 4 times the distance between the cooling surfaces. Suitable distances between the baffles in the direction of motion of the moving cooling surface are between 1 and 10 times the distance between the cooling surfaces.

To allow regulation of the time during which the product remains in the reaction apparatus, the protruding members can be arranged in the form of a spiral along the moving cooling surface, if the latter is made in the form of a circular rotor as shown in FIGS. 2–4. It is thereby made possible to adapt in a suitable manner the amount of organic liquid in relation to the amount of $SO_3$ contained in the gas mixture. If, for example, the protruding members are arranged in a spiral which endeavours to press the reaction mixture towards the outlet opening, the time during which the organic liquid remains in the reactor is cut down, whereas the opposite result is obtained if the spiral is turned in the other direction. In order to ensure the best possible dispersion, pegs or baffles should be so displaced in relation so succeeding or following pegs or baffles in the direction of flow that every portion of the stationary cooling surface will be passed by the tip of a peg of baffle at a very short distance during one cycle.

Another embodiment of the protruding members can be in the form of a perforated steel mat, placed on top of and affixed to the moving cooling surface. The preferred embodiment of the protruding members, however, is substantially cylindrical pegs.

The relative speed of the moving cooling surface should be kept as high as possible in order to attain the best dispersing effect and so that the coefficient of heat transfer will be as favourable as possible. The speed, however, must not be so high that the organic liquid is thrown away from the moving cooling surface and over on to the stationary cooling surface, forming a layer on the latter so that the gas mixture has to pass in a liquidless space between the two cooling surfaces. This would result in both poor dispersion of the gas mixture in the organic liquid and a poor coefficient of heat transfer on the moving cooling surface. Both of these factors give rise to discolouration of the final product. If the moving cooling surface is designed as a largely cylindrical rotor arranged concentrically within a largely cylindrical, outer, stationary cooling surface, a speed of 300 to 1500 r.p.m., preferably 500–700 r.p.m., has proved suitable. A speed of about 600 r.p.m. has been found particularly suitable.

The mixture of sulphur trioxide gas and inert gas should, in order to avoid any reaction outside the reaction apparatus, be introduced into this at a point that is separated from the supply point for the organic substance, e.g., at two separate points in one end of the reaction apparatus as shown in FIG. 1. It is also possible to introduce the organic substance through the end of the reaction apparatus and to introduce the sulphonating gas through nozzles affixed to the sides of the reaction apparatus as described in Example 5. The apparatus shown in the drawings is purely schematical and includes only such parts as are essential in order to impart an understanding of the idea of the invention. Other details which may be required in order to impart mechanical perfection to the arrangement but which have no bearing on the actual idea of the invention and can easily be designed by the technicians have been excluded. These include, for instance, the detailed shaping of bearings, gaskets for shaft passages, cooling devices, etc. The parts shown can also be modified in numerous ways within the framework formed by the idea of the invention. The arrangement, for instance, can work with a vertical or horizontal axis of symmetry or in any and every intermediate position and the protruding members can have other cross-sections than largely circular ones, when pegs are used, for example elliptical.

The invention is illustrated by the following examples.

EXAMPLE 1

A reactor according to FIG. 1 was constructed. It consisted partly of a stator 3, equipped with a cooling jacket with a cooling-water inlet 9 and cooling-water outlet 10. A rotor 1, driven round by a motor, was placed inside the stator. The interior of the rotor was cooled through a water inlet 7 and a water outlet 8. Affixed round the rotor were pegs 2 of the appearance shown in FIG. 2 in the drawing, with a diameter of 1 mm. and a length of 7 mm. The inside diameter of the stator was 75 mm. and the outside diameter of the rotor 60 mm. The pegs were located at a distance of 10 mm. from one another in the form of a spiral, with the spiral rising 10 mm. per turn. The length of the rotor was 500 mm. and that of the stator 750 mm. Sulphur trioxide gas was introduced through the bottom end 4 and the organic substance was introduced through the bottom inlet 5. The departing mixture of product and residual gas was taken out at the top of the reactor 6 for separation.

At the same time as a mixture of sulphur trioxide and air, containing 6% $SO_3$, was introduced through the bottom inlet 4, a flow of 2.5 litres per hour of dodecyl benzene, prepared by alkylation of benzene with tetrapropylene in the known manner, was introduced. The speed of the rotor was maintained at 600 r.p.m. At a reaction temperature of 34° C. on the part of the departing sulphonic acid, a colour of 2 Gardner in 15% solution was obtained, when the degree of sulphonation was kept at 105% sulphur trioxide, counted on the theoretically requisite amount at equivalent charging of dodecyl benzene and $SO_3$. The content of unsulphonated substance amounted to 1.4% of the weight of the sulphonic acid.

The average size of the gas bubbles in the dispersion obtained was 1–2 mm.

With the same reactor, but now fitted with a rotor without pegs, a sulphonic acid was obtained at otherwise similar reaction conditions with a colour of 7 Gardner and a content of unsulphonated substance amounting to 1.7% of the weight of the sulphonic acid.

EXAMPLE 2

The same reactor as in Example 1 was used. Instead of dodecyl benzene, however, technical lauryl alcohol with a melting point of 20.5° C. was introduced. The reaction temperature was maintained at 30° C. The speed of the rotor was 600 r.p.m. The mixture of sulphur trioxide and air was adapted so as to contain 6% $SO_3$ and the quantity of mixture admitted was so regulated that a sulphation degree of 104% was maintained in the outgoing product. The average size of the gas bubbles in the dispersion obtained was 1–2 mm. After neutralization with dilute sodium hydroxide solution a product was obtained with the following analysis:

|  | Percent |
|---|---|
| Active, surface-active material | 28.9 |
| Unsulphonated | 1.4 |
| Salt content | 0.9 |
| Product colour, unbleached, 15% active material, 3 Gardner. | |

With the same reactor, but now fitted with a rotor without pegs, a product was obtained at otherwise similar reaction conditions with the following analysis:

|  | Percent |
|---|---|
| Active material | 27.0 |
| Unsulphonated | 1.8 |
| Salt content | 1.3 |
| Product colour, unbleached, 15% active material, 5 Gardner. | |

EXAMPLE 3

The same reactor as in Example 1 was used. Instead of dodecyl benzene, an alkyl phenol-ethylene oxide adduct, produced by adding 1 mole of nonyl phenol to 4 moles of ethylene oxide in a known manner, was introduced. The mixture of sulphur trioxide and air used contained 5% $SO_3$. The reaction temperature was maintained at 30° C. The speed of the reactor was maintained at 600 r.p.m. The adduct was pumped in at the rate of 3.0 kg./h. and the amount of gas was so adapted that a sulphating degree of 110% was obtained. The average size of the gas bubbles in the dispersion obtained was 1–2 mm. After neutralization with dilute sodium hydroxide solution a product was obtained with the following analysis:

| | Percent |
|---|---|
| Active, surface-active material | 32.0 |
| Unsulphonated | 2.9 |
| Salt content | 1.4 |

Product colour, unbleached, 32% active material, 5 Gardner.

With the same reactor, but now fitted with a rotor without pegs, a product was obtained at otherwise similar reaction conditions with the following analysis:

| | Percent |
|---|---|
| Active material | 29.3 |
| Unsulphonated | 3.6 |
| Salt content | 1.8 |

Product colour, unbleached, 29.3% active material, 9 Gardner.

EXAMPLE 4

A reactor with broadly the same construction as that shown in FIG. 1 was used. The rotor was provided, however, with longitudinal, profilated baffles in accordance with FIG. 4. The speed of the rotor was maintained at 700 r.p.m. Instead of dodecyl benzene, however, tridecyl alcohol, with the boiling-point interval 252–262° C., was introduced. The reaction temperature was maintained at 20–25° C. The average size of the gas bubbles in the dispersion obtained was 1–2 mm. Analysis of the neutralized product gave the following figures:

| | Percent |
|---|---|
| Active material | 43.6 |
| Unsulphonated | 0.78 |
| Salt content | 1.2 |

Product colour, unbleached, 15% active material, under 1 Gardner.

EXAMPLE 5

A reactor with the same construction as that shown in FIG. 1 was used. The gas, however, was introduced through gas-inlet nozzles, three in all, mounted on the sides of the reactor and located on the lower third thereof. The introduced gas had an $SO_3$ content of 5%. The substance sulphated was chemically pure octanol (2-ethylhexanol). The reaction temperature was maintained at 20–25° C. The average size of the gas bubbles in the dispersion obtained was less than 1 mm. The degree of sulphation was 104%. After neutralization with dilute sodium hydroxide solution, the product had the following analysis:

| | Percent |
|---|---|
| Active material | 37.7 |
| Unsulphated | 0.5 |
| Salt content | 2 |

Product colour, unbleached, 15% active material, under 1 Gardner.

We we claim is:

1. Apparatus for the continuous sulphonation and/or sulphation of liquid organic subtsances with sulfur trioxide gas-inert gas mixtures, adapted to achieve a uniform rate of sulphonation and/or sulphation, with lessened color deterioration of the reaction product, and a lower proportion of unsulphonated material, comprising in combination, a substantially cylindrical stator; a substantially cylindrical rotor, concentrically and rotatably mounted within the stator, spaced from the inner wall thereof, and defining an annular reaction zone therebetween within which can be disposed a sulphonation and/or sulphation reaction mixture; means for rotating the rotor at a rotational speed within the range from about 300 to about 1500 r.p.m.; means disposed within the rotor for cooling the rotor surface; a stationary outer cooling means surrounding the stator; means for circulating a cooling fluid through each cooling means, and means for controlling the temperature of the cooling fluids to maintain a reaction mixture within the reaction zone at a temperature below about 70° C.; and a plurality of projecting members disposed on the outer surface of the rotor, so designed and positioned thereon that when the rotor is rotated, the protruding members uniformly agitate a reaction mixture disposed in the reaction zone, with substantially no dead zones therein, the protruding members having a cylindrical or conical form, with a generally circular cross section, having a height that is within the range from about 0.1 to about 0.9 times the width of the reaction zone, having a cross sectional dimension of from 0.1 to 1 time the width of the reaction zone, and being uniformly spaced on the rotor surface at a spacing within the range from about 8 to about 20 times their diameter, measured in the direction of rotation of the rotor, and at a spacing of from about 3 to 15 diameters, measured at right angles to the direction of rotation of the rotor; an inlet for the introduction of organic substance to be sulphonated and/or sulphated to the reaction zone; an inlet spaced therefrom for the introduction of sulfur trioxide-inert gas mixture into the same zone; and an outlet for the withdrawal of unreacted gases and reaction mixture from the said zone.

2. Apparatus in accordance with claim 1, in which the protruding members are so arranged that the flow of the reaction mixture is directed towards the outlet.

3. Apparatus in accordance with claim 2, in which the protruding members are arranged in the form of a spiral, so as to direct the flow of the reaction mixture towards the outlet.

4. Apparatus in accordance with claim 1, in which the protruding members are in the form of cylindrical pegs.

5. Apparatus in accordance with claim 1, in which the protruding members are in the form of cones, with the base of the cone located on the rotor and the tips of the cones cut off squarely, with a cross sectional dimension at the tip within the range of from about 0.1 to about 1 times the width of the reaction zone.

6. An apparatus in accordance with claim 1, in which the protruding members are so placed in relation to each other in the direction of flow that every portion of the inner wall of the stator vessel is passed by the tip of a protruding member at a very short distance during each rotation of the rotor.

7. Apparatus for the continuous sulphonation and/or sulphation of liquid organic substances with sulfur trioxide gas-inert gas mixtures, adapted to achieve a uniform rate of sulphonation and/or sulphation with lessened color deterioration of the reaction product and a lower proportion of unsulphonated material, comprising, in combination, a substantially cylindrical stator, a substantially cylindrical rotor concentrically and rotatably mounted within the stator, spaced from the inner wall thereof; and defining a reaction zone therein within which can be disposed a sulphonation and/or sulphation reaction mixture; means for rotating the rotor at a rotational speed within the range from about 300 to about 1500 r.p.m.; means for cooling the rotor surfaces; a stationary outer cooling means surrounding the stator; means for circulating a cooling fluid through each cooling means, and means for controlling the temperature of the cooling fluids to maintain a reaction mixture within the reaction zone at a temperature below about 70° C.; and a plurality of baffles disposed on the outer surface of the rotor and extending outwardly therefrom, so designed and positioned thereon that when the rotor is rotated, the baffles uniformly agitate a reaction mixture disposed in the reaction zone, with substantially no dead zones therein; the baffles having a height within the range from about 0.2 to about 0.9 times the width of the reaction zone, and a width within the range of about 0.2 to about 0.9 time the width of the reaction zone, the baffles having rectangular recesses of a height within the range of about 0.3 to about 0.7 times the width of the reaction zone, and a width within the range from about 3 to about 4 times the width of the reaction zone; and being uniformly spaced on the rotor surface, at a spacing within the range from about 1 to about 10 times the width of the reaction zone in the direction of rotation of the rotor; an inlet for the introduction of organic substance to be sulphonated and/or sulphated to the reaction zone; an inlet spaced therefrom for the introduction of sulfur trioxide-inert gas mixture into the same zone; and an outlet for the withdrawal of unreacted gases and reaction mixture from the said zone.

8. An apparatus in accordance with claim 7 in which the baffles are arranged in the form of a spiral along the rotor, so as to direct the flow of the reaction mixture towards the outlet.

9. An apparatus in accordance with claim 7 in which the baffles are so placed in relation to each other in the direction of flow that every portion of the inner wall of the stator is passed by the tip of a baffle at a very short distance during each rotation of the rotor.

References Cited

UNITED STATES PATENTS

| | | |
|---|---|---|
| 2,367,279 | 1/1945 | Houlton. |
| 2,463,262 | 3/1949 | Goldsby _____ 23—285 |
| 2,955,026 | 10/1960 | Hollings et al. _____ 23—285 |
| 3,257,175 | 6/1966 | Brooks et al. _____ 23—285 |

JAMES H. TAYMAN, Jr., *Primary Examiner.*

U.S. Cl. X.R.

23—290; 259—8; 165—92, 141; 260—686, 457

U.S. DEPARTMENT OF COMMERCE
PATENT OFFICE
Washington, D.C. 20231

UNITED STATES PATENT OFFICE
CERTIFICATE OF CORRECTION

Patent No. 3,438,742                              April 15, 1969

Helmut Grunewald et al.

It is certified that error appears in the above identified patent and that said Letters Patent are hereby corrected as shown below:

Column 7, line 55, "We" should read -- What --; line 57, "subtsances" should read -- substances --. Column 8, line 10, "time" should read -- times --; line 69, "0.2 to about 0.9 time" should read -- 2 to about 5 times --.

Signed and sealed this 15th day of September 1970.

(SEAL)
Attest:

Edward M. Fletcher, Jr.                        WILLIAM E. SCHUYLER, JR.
Attesting Officer                                  Commissioner of Patents